No. 867,250. PATENTED OCT. 1, 1907.
C. G. DAVIS.
ASH RECEPTACLE AND HOLDER FOR CIGARS.
APPLICATION FILED MAY 16, 1907.

Inventor
C. G. DAVIS,

Witnesses

Attorneys

UNITED STATES PATENT OFFICE.

CLEVELAND G. DAVIS, OF MANISTEE, MICHIGAN.

ASH-RECEPTACLE AND HOLDER FOR CIGARS.

No. 867,250.　　　　　Specification of Letters Patent.　　　　　Patented Oct. 1, 1907.

Application filed May 16, 1907. Serial No. 373,998.

*To all whom it may concern:*

Be it known that I, CLEVELAND G. DAVIS, a citizen of the United States, residing at Manistee, in the county of Manistee and State of Michigan, have invented certain new and useful Improvements in Ash-Receptacles and Holders for Cigars, of which the following is a specification.

The present invention relates to a combined cigar holder and ash receptacle, and has for its object to provide a simple and inexpensive device of this character which will remove the ashes from the burning end of the cigar and support the cigar in such a manner as to prevent contamination of the wet end thereof.

With this object in view the invention resides principally in the provision of a receptacle for receiving the ashes, and a perforate cigar holder arranged within the receptacle and spaced from the bottom thereof and designed to receive the burning end of the cigar.

Figure 1:
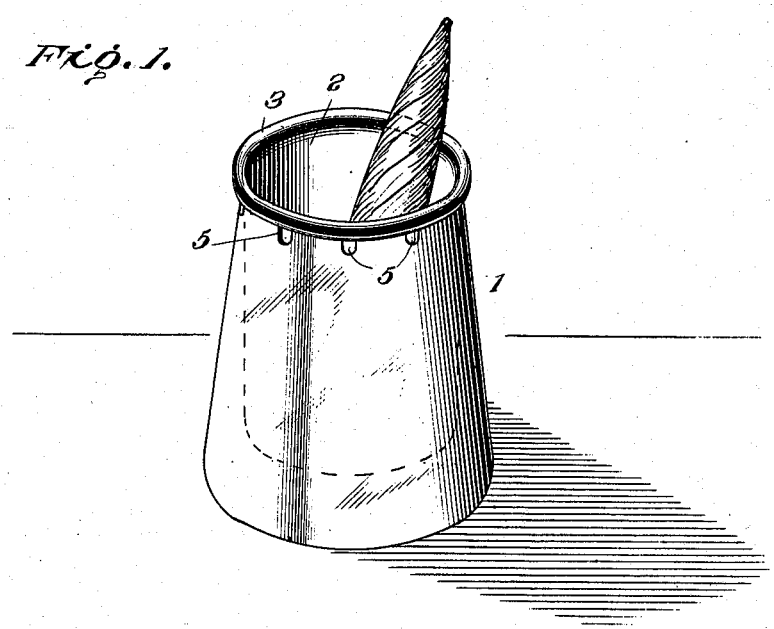
Figure 2:
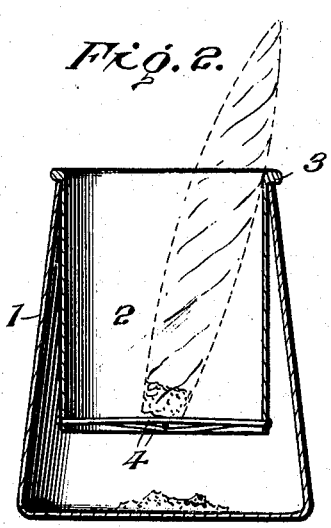
Figure 3:
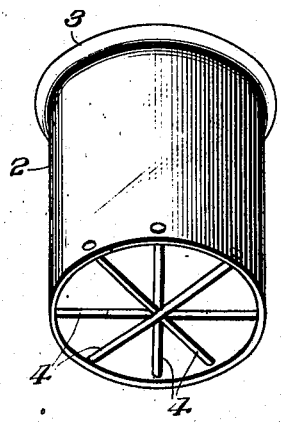

For a full description of the invention and the merits thereof and also to acquire a knowledge of the details of construction and the means for effecting the result, reference is to be had to the following description and accompanying drawings, in which:

Figure 1 is a perspective view of a cigar holder and ash receptacle constructed in accordance with the invention. Fig. 2 is a vertical sectional view through the same. Fig. 3 is a detached perspective view of the inner shell.

Corresponding and like parts are referred to in the following description and indicated in all the views of the drawings by the same reference characters.

Specifically describing the present embodiment of the invention the numeral 1 designates the outer receptacle which is designed to receive the cigar ashes and preferably has the lower portion thereof enlarged. In the present instance the walls of the receptacle converge upwardly and the said receptacle has approximately the shape of a truncated cone.

An inner shell 2 is mounted within the outer receptacle 1 and comprises a cylindrical member fitting within the mouth of the outer receptacle and provided with a laterally extending annular flange 3 engaging the upper edge of the receptacle to support the shell in the required position. The bottom of the shell 2 has a perforate structure to support the burning end of the cigar and break the ashes therefrom whereupon they fall into the receptacle 1. If found desirable as in the present instance the perforate bottom of the shell may be formed of a series of transverse rods or wires 4 which are so spaced as to prevent the cigar from falling through.

In order to provide for a circulation of air the walls of the outer receptacle 1 are formed with inlets 5 which may be in the nature of notches in the upper edge thereof and permit the cold air from the outside to pass down into the body of the receptacle between the walls of the said receptacle and the shell to replace the hot air rising through the shell. This construction produces a constant draft which prevents the cigar from going out and causes the same to burn evenly.

The inner shell 2 is preferably made removable for the purpose of facilitating removal of the ashes from the outer receptacle 1.

When the cigar is placed in position as shown in Fig. 1 the burning end thereof is thrust downwardly through the shell 2 into contact with the wires 4 whereas the opposite end projects upwardly beyond the holder and is prevented from contamination by contact with exterior objects.

Having thus described the invention, what is claimed as new is:—

1. In a device of the character described, the combination of a receptacle, and a shell supported within the receptacle, the sides of the shell being spaced from the sides of the receptacle and the shell being formed with a perforate bottom.

2. In a device of the character described, the combination of a receptacle, a shell arranged within the receptacle, and a rim extending around the shell and engaging the mouth of the receptacle for supporting the shell, the sides of the shell being spaced from the sides of the receptacle and the shell being formed with a perforate bottom.

3. In a device of the character described, the combination of a receptacle having upwardly converging sides, and a shell formed with straight sides and a perforate bottom, the said shell being supported within the receptacle and the perforate bottom of the shell being spaced from the bottom of the receptacle.

4. In a device of the character described, the combination of a receptacle, a shell supported within the receptacle and spaced from the sides thereof, and a perforate bottom for the shell, the said shell having an air inlet in the walls thereof for the purpose of producing a circulation of air.

5. In a device of the character described, the combination of a receptacle the sides of which converge upwardly, a shell arranged within the mouth of the receptacle and formed with straight sides, and a perforate bottom for the shell, the walls of the receptacle being formed with an air inlet to produce a circulation of air.

In testimony whereof I affix my signature in presence of two witnesses.

CLEVELAND G. DAVIS. [L. S.]

Witnesses:
　JAMES L. SIBBEN,
　KATHRYN CICHY.